G. MATHEWS.
NUT LOCKING DEVICE.
APPLICATION FILED DEC. 26, 1911.
1,030,106.
Patented June 18, 1912.
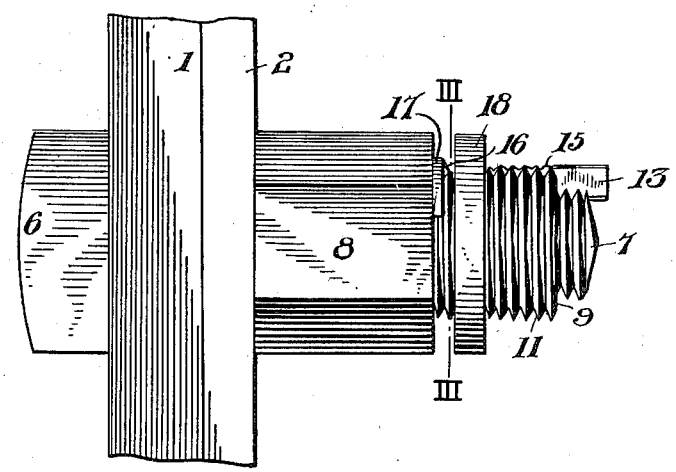
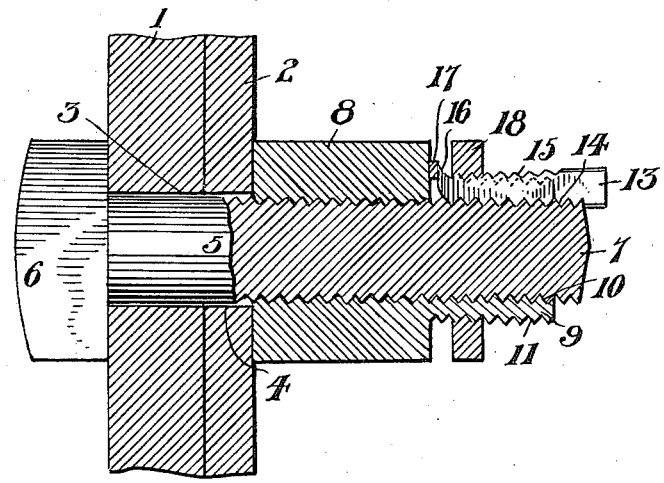
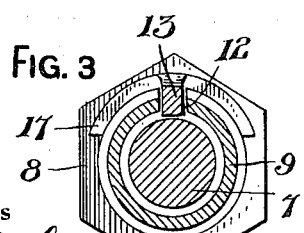
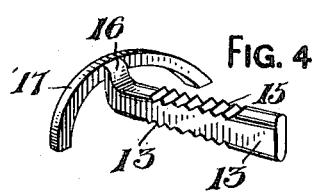
WITNESSES
INVENTOR
G. Mathews
BY
ATTORNEYS

UNITED STATES PATENT OFFICE.

GEORGE MATHEWS, OF NEW CASTLE, PENNSYLVANIA.

NUT-LOCKING DEVICE.

1,030,106.  Specification of Letters Patent.  Patented June 18, 1912.

Application filed December 26, 1911. Serial No. 667,669.

*To all whom it may concern:*

Be it known that I, GEORGE MATHEWS, a citizen of the United States of America, residing at New Castle, in the county of Lawrence and State of Pennsylvania, have invented certain new and useful Improvements in Nut-Locking Devices, of which the following is a specification, reference being had therein to the accompanying drawing.

This invention relates to a nut locking device, and the objects of my invention are to provide simple and effective means in a manner as will be hereinafter set forth, for locking a nut upon the bolt whereby the nut cannot become accidentally displaced, and to provide a nut locking device that can be advantageously used in connection with rail joints, rolling stock, bridges, and structures subjected to vibrations.

Other objects of my invention are to provide a nut locking device that can be easily and quickly installed without the use of skilled labor, and to accomplish the above results by a mechanical construction that is durable, inexpensive to manufacture, and highly efficient for the purposes for which it is intended.

With the above and other objects in view, the invention resides in the novel construction, combination and arrangement of parts to be hereinafter specifically described and then claimed.

Reference will now be had to the drawing wherein—

Figure 1 is a side elevation of the nut locking device; Fig. 2 is a longitudinal sectional view of the same; Fig. 3 is a cross sectional view taken on the lines III—III of Fig. 1; and Fig. 4 is a perspective view of the detached locking member.

The reference numerals 1 and 2, denote, by the way of example, two pieces of material having alining openings 3 and 4 to receive a bolt 5, said bolt having a head 6 engaging the outer side of the piece of material 1 and a threaded end 7 protruding from the opening 4 of the piece of material 2.

Screwed upon the threaded end 7 of the bolt 5 is a nut 8, said nut having an outwardly extending sleeve 9 provided with interior screw threads 10 and exterior screw threads 11, the screw threads 10 receiving the threads of the bolt 5. The sleeve 9 is provided with a longitudinal slot 12 extending from the outer face of the nut 8 to the outer ends of said sleeve.

Arranged within the slot 12 of the sleeve 9 is a locking member 13 which tapers from the outer end thereof to the inner end. Said locking member has the lower edge provided with teeth 14 to engage the thread of the bolt 5 and the upper edge of the member has teeth 15 for a purpose that will presently appear. The inner end of the locking member 13 is offset, as at 16, and provided with a semi-circular flat head 17 adapted to engage the outer face of the nut 8.

Adjustably mounted upon the sleeve 9 and engaging the threads 11 thereof, is a jam nut or collar 18 that engages the teeth 15 of the locking member 13.

The manner of assembling the nut locking device is as follows:—After the bolt 5 has been placed in engagement with the material, the locking member 13 is placed in engagement with the sleeve 9, and then the jam nut or collar 18 is screwed upon the sleeve in proximity to the nut 8. The nut 8 and the sleeve are then screwed upon the threaded end 7 of the bolt 5 and after the nut 8 engages the material, the jam nut or collar 18 is screwed outwardly, whereby it will force the locking member 13 into engagement with the threads of the bolt 5 and bind said locking member upon the bolt with the head 17 in engagement with the nut 8. The semi-circular flat head 17 prevents the radial inward movement of the key previous to the application of the device to a bolt and thus facilitates the entering of the device upon the bolt. In this manner the nut 8, sleeve 9, member 13, and jam nut or collar 18 are all locked together upon the bolt 5 and the nut 8 cannot become accidentally displaced.

What I claim is:

1. In a nut locking device, the combination with a bolt, of a nut screwed upon said bolt, a sleeve carried by said nut and having exterior threads, said sleeve having a slot formed therein extending from the outer face of said nut to the end of said sleeve, a toothed tapering locking member arranged in the slot of said sleeve, a head carried by the inner end of said member and engaging the outer face of said nut, and a jam nut screwed upon said sleeve and engaging the outer edge of said member for binding said member in engagement with the threads of said bolt.

2. In a nut locking device, a bolt, a nut screwed upon said bolt, an interiorly and exteriorly screw threaded sleeve formed integral with the outer face of said nut, said sleeve having a longitudinal slot formed therein, a toothed tapering locking member arranged in the slot of said sleeve, a head carried by the inner end of said member and engaging the outer face of said nut, and a jam nut screwed upon said sleeve and adapted to engage the outer edge of said member and bind said member in engagement with said bolt.

3. In a nut locking device, a threaded bolt, a nut mounted thereon, a sleeve projecting from the nut and provided with interior and exterior threads and further having a longitudinal slot, a tapering locking member arranged in said slot and having teeth on one edge engaging with the threads of the bolt and further having teeth on its outer edge, a semicircular flat head carried by the inner end of said member and capable of engaging the exterior peripheral face of the sleeve to prevent radial inward movement of the locking member previous to the application of the device to a bolt, and a nut mounted upon said sleeve and engaging the teeth on the outer edge of said member thereby binding the latter in engagement with the bolt.

4. A nut locking device comprising the combination with a threaded bolt, of a nut mounted thereon, a sleeve projecting therefrom and having interior and exterior threads, said interior threads engaging with the threads of the bolt, said sleeve further having a longitudinal slot, a toothed tapering locking member arranged in said slot and having its inner end offset, a semi-circular head carried by said offset portion of said member and engaging the exterior peripheral face of the sleeve to prevent the radial inward movement of the key previous to the application of the device to the bolt, and a nut engaging said sleeve and further engaging the outer edge of said member for binding the latter in engagement with the threads of the bolt.

In testimony whereof I affix my signature in the presence of two witnesses.

GEORGE MATHEWS.

Witnesses:
E. J. BLANNING,
FRANK MCARTHUR.

---

Copies of this patent may be obtained for five cents each, by addressing the "Commissioner of Patents, Washington, D. C."